INVENTORS
Orlestus R. Brenner
BY George L. Reser
Wood, Herron & Evans
ATTORNEYS

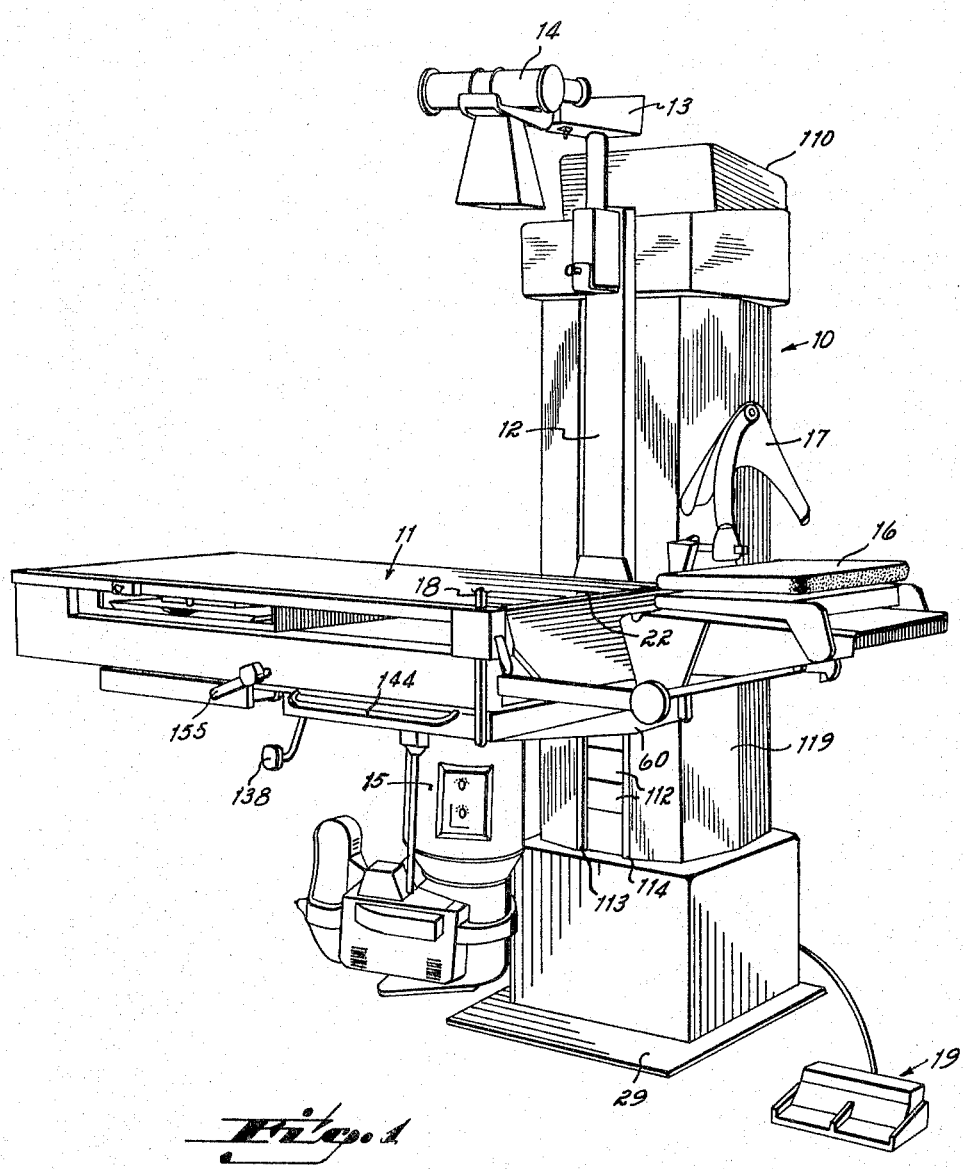

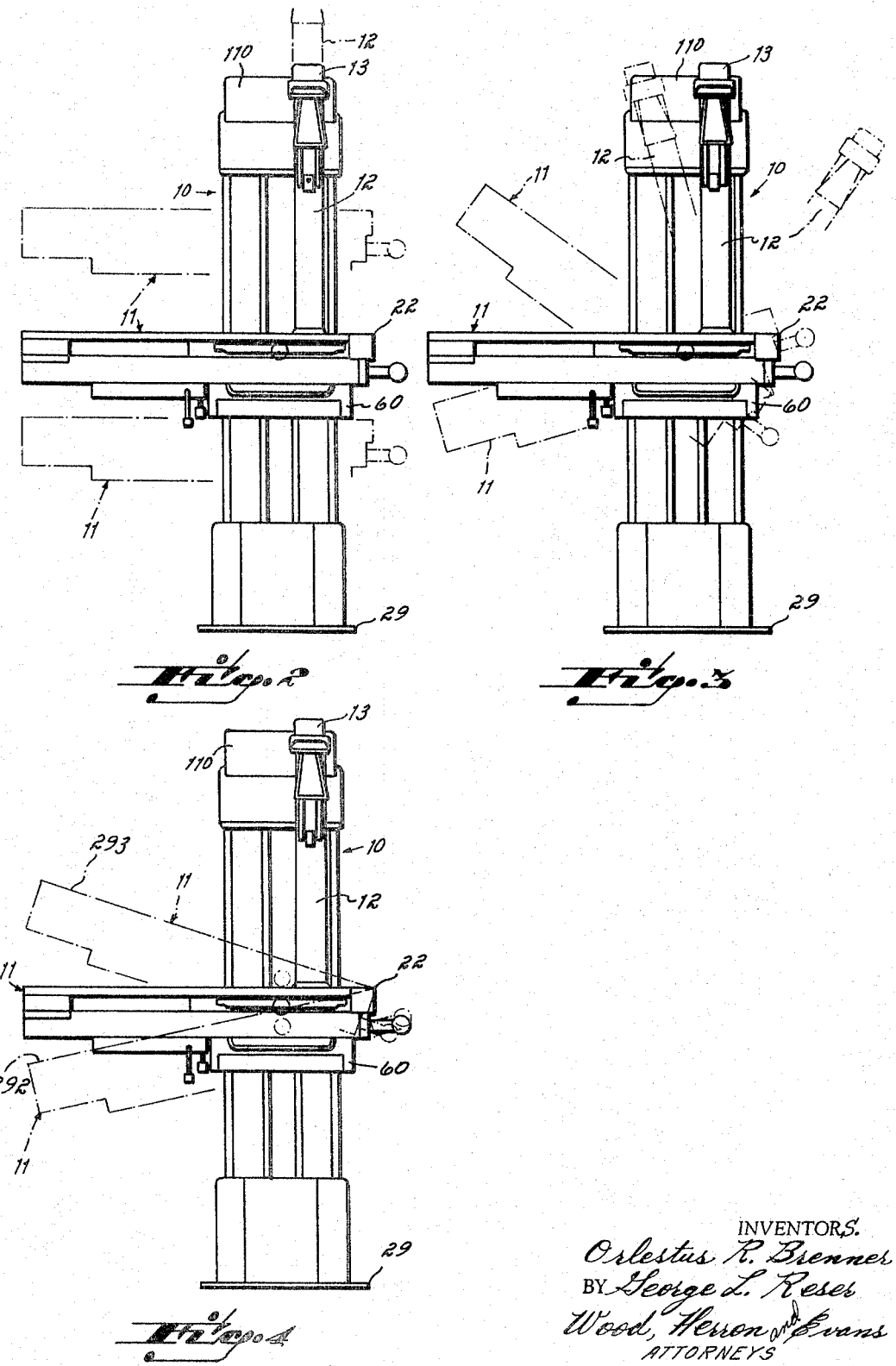

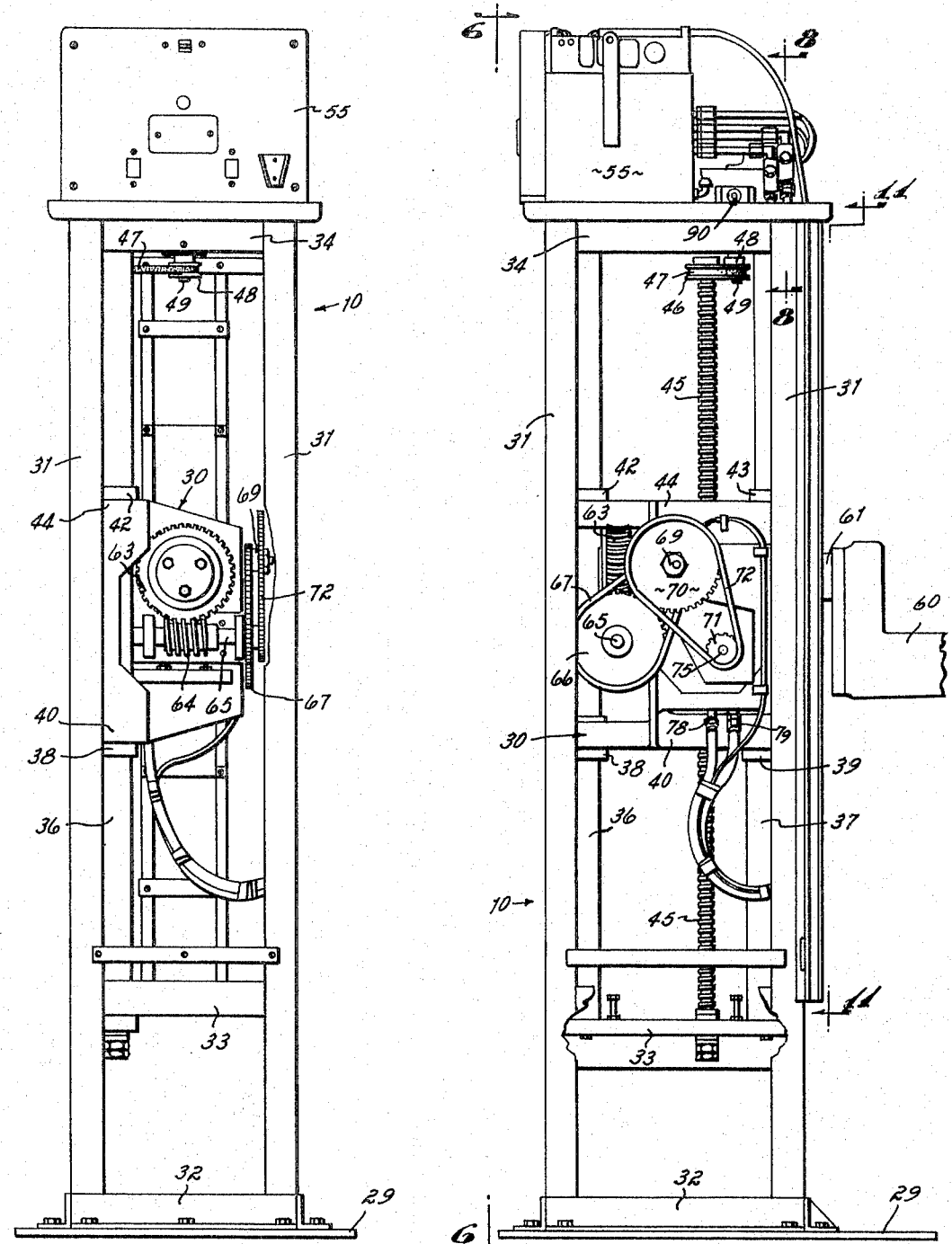

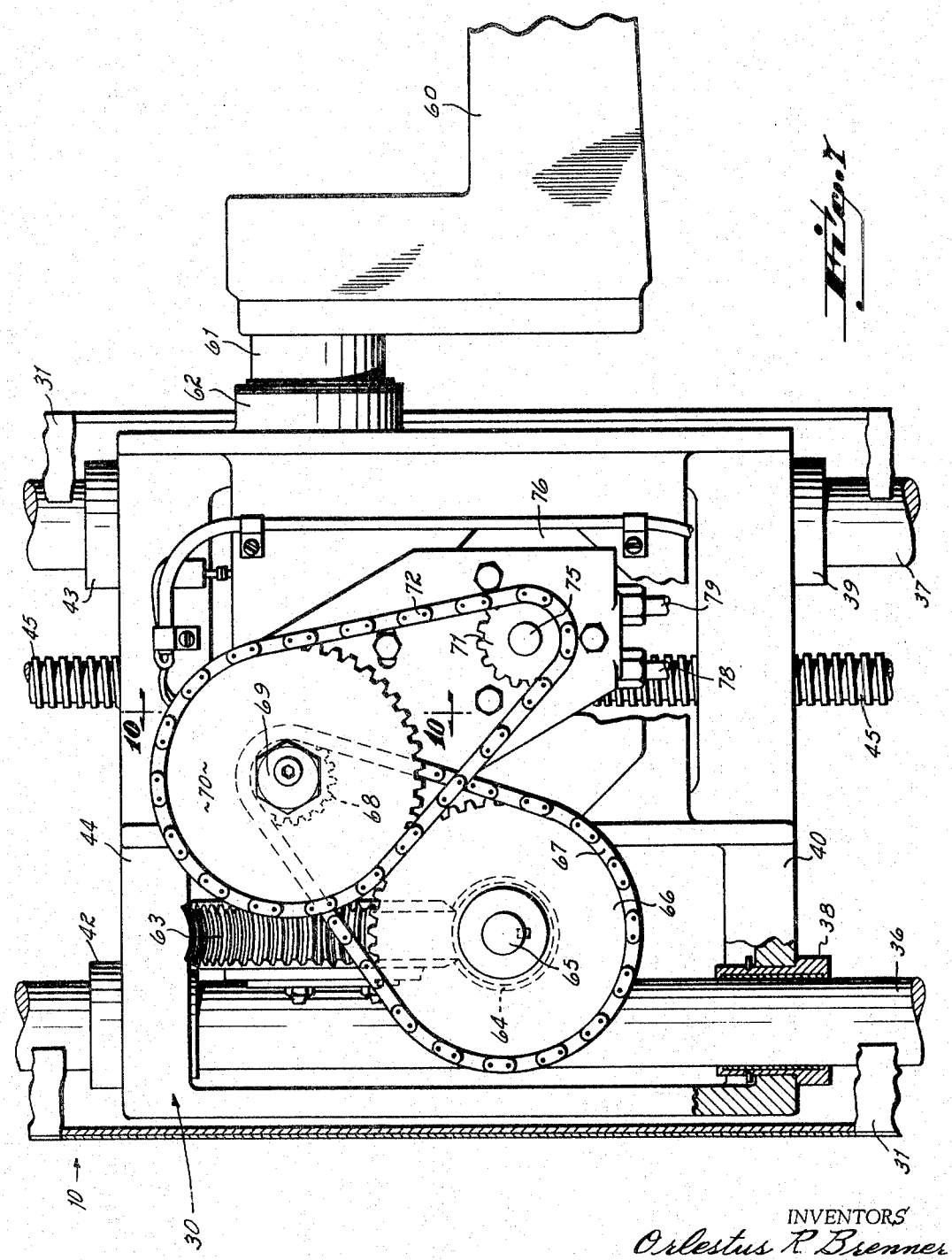

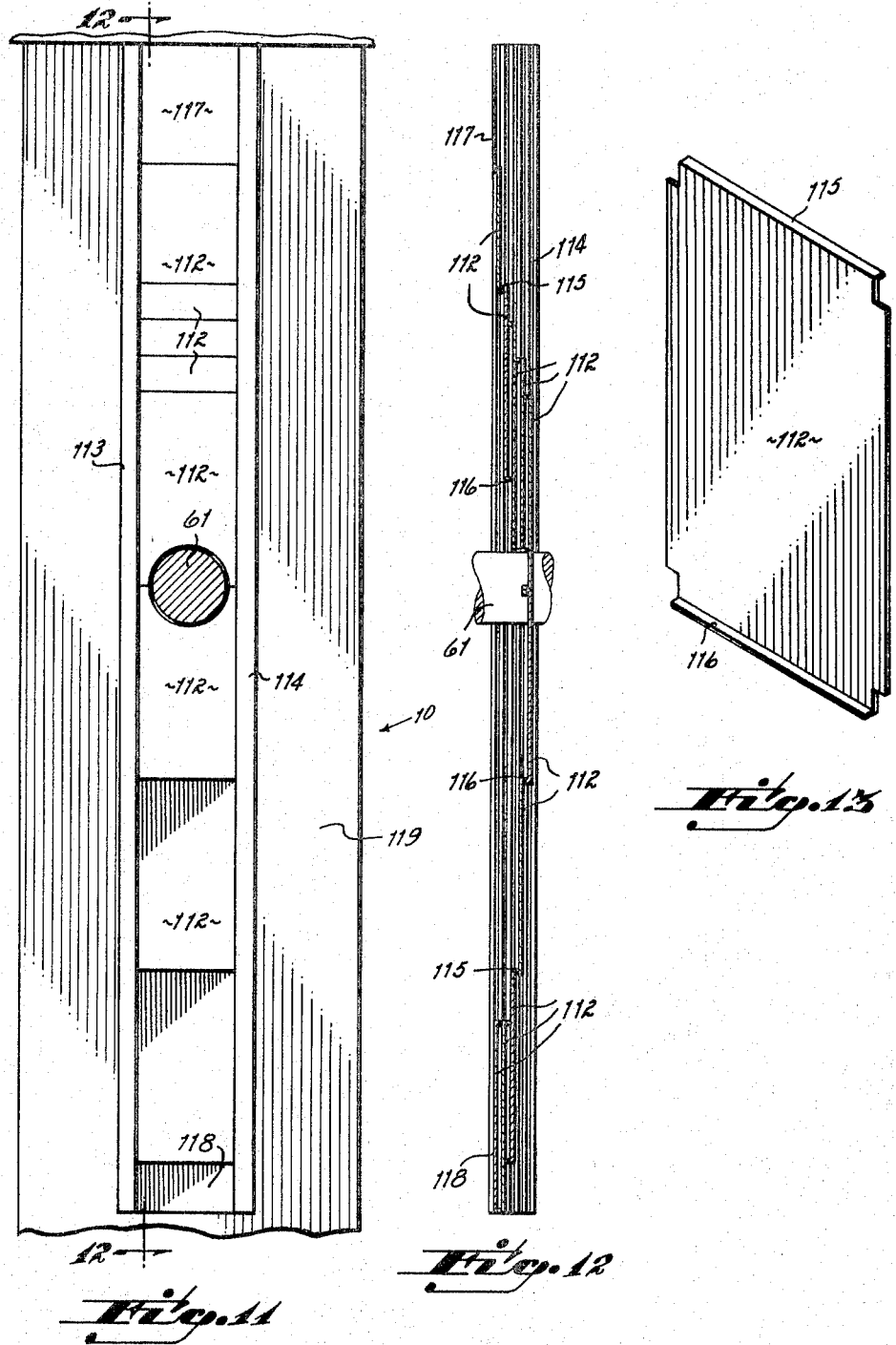

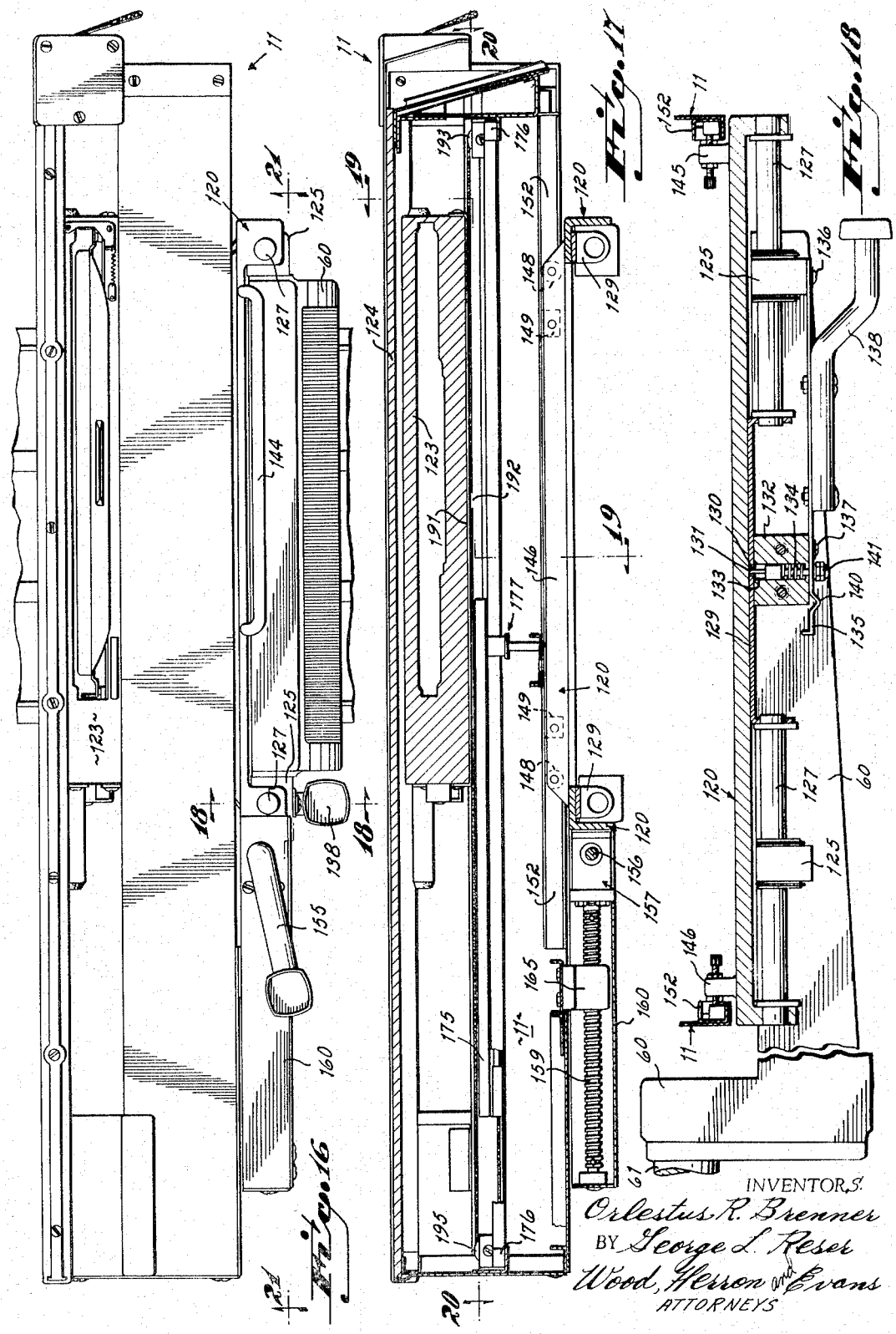

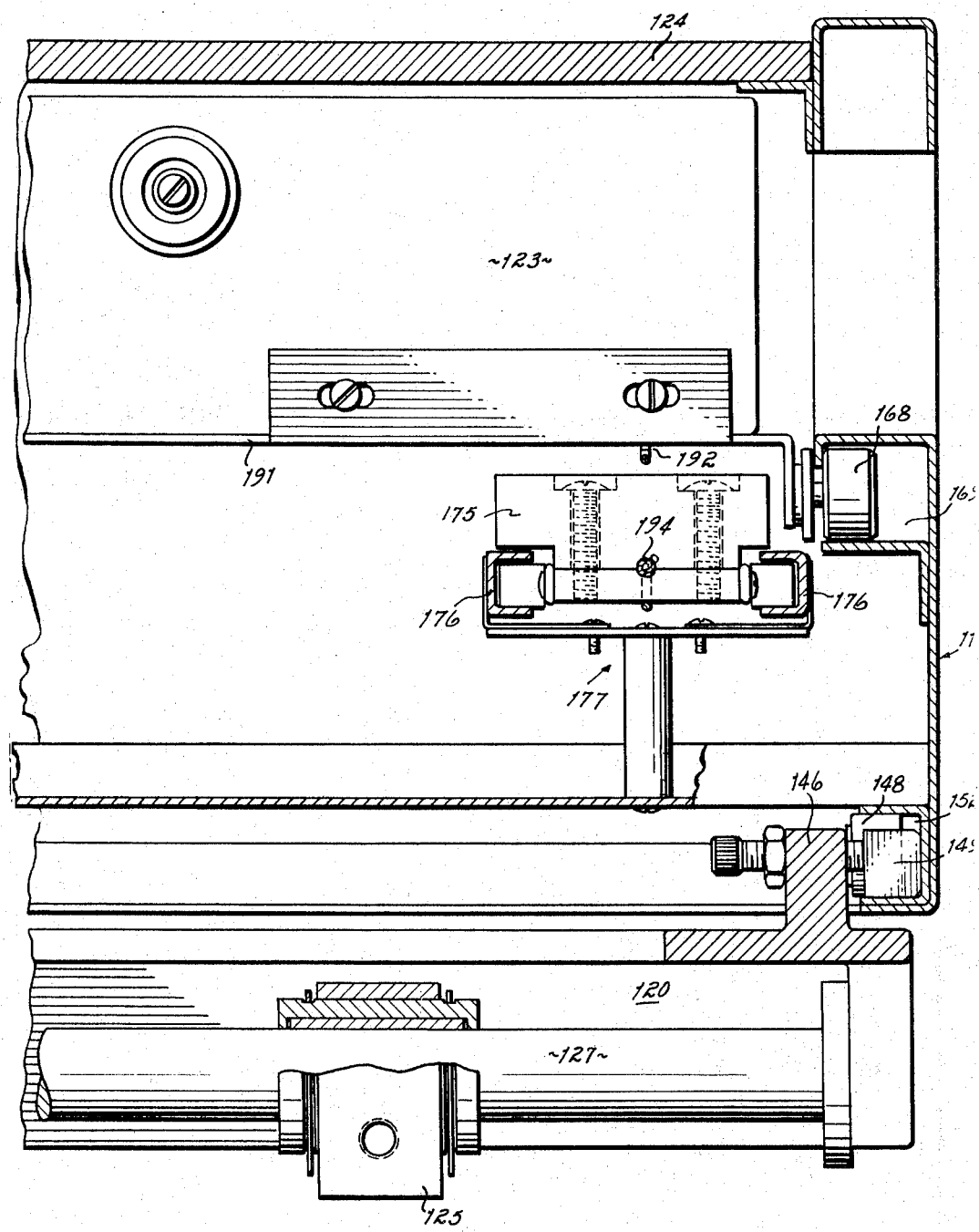

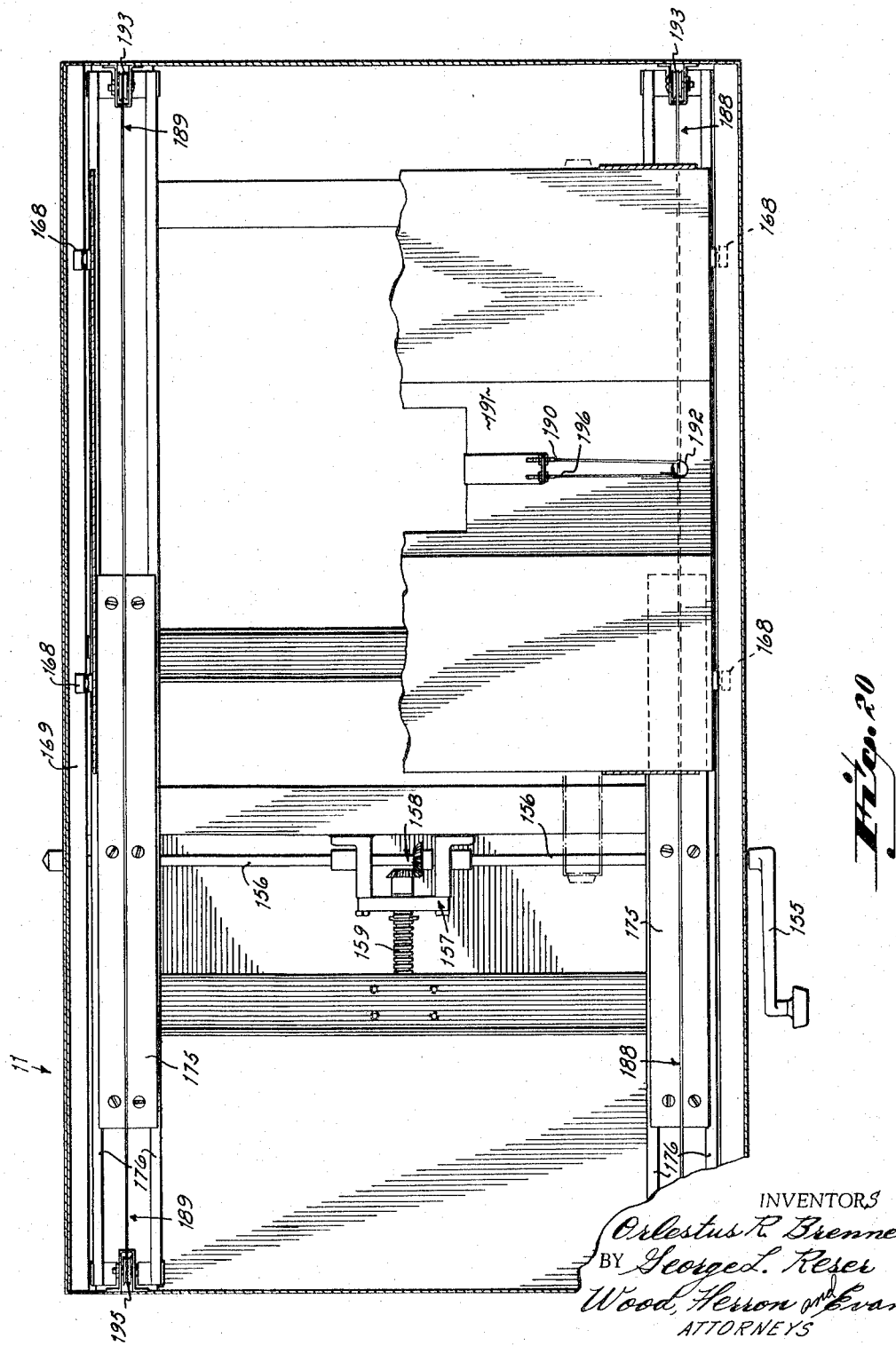

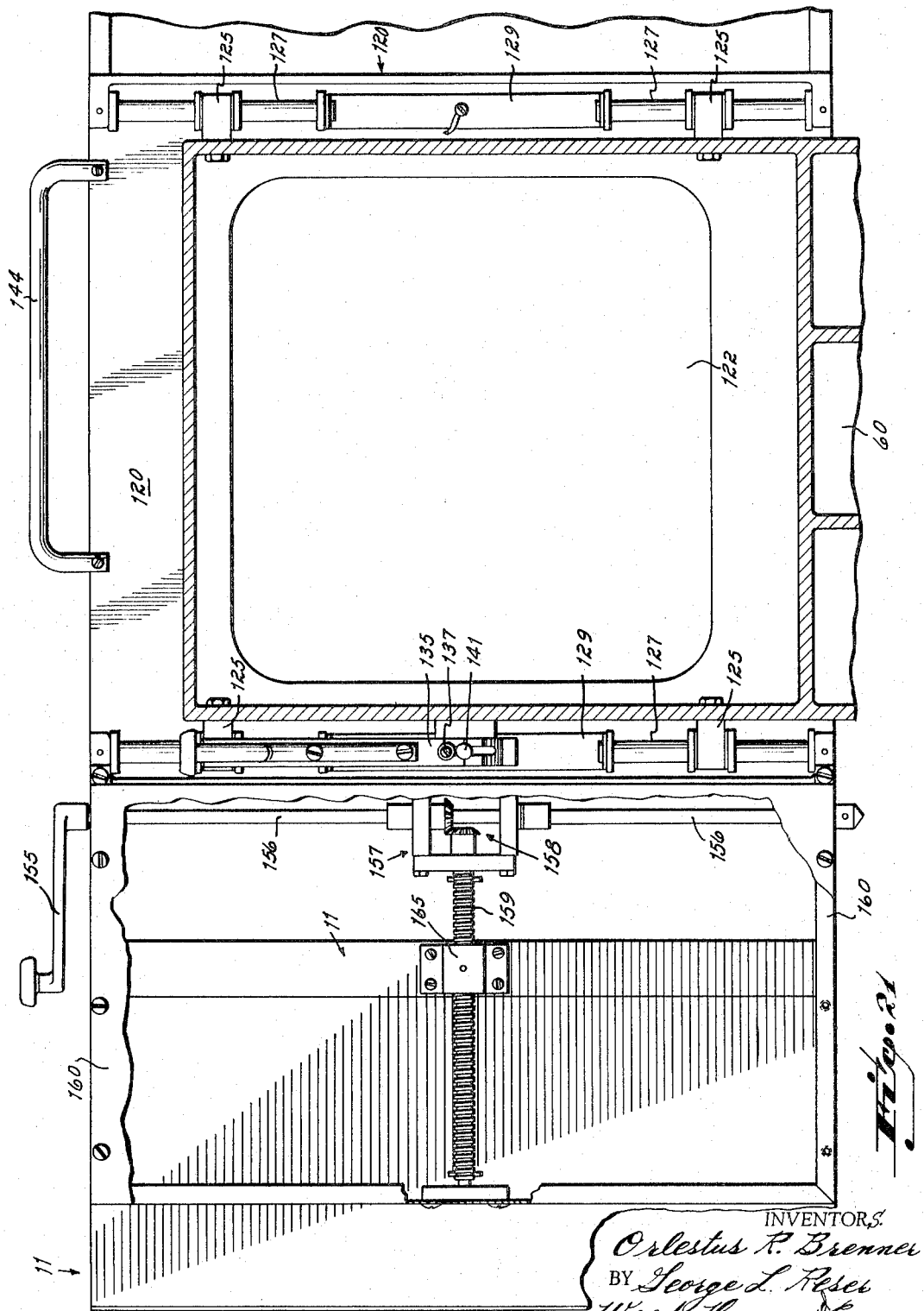

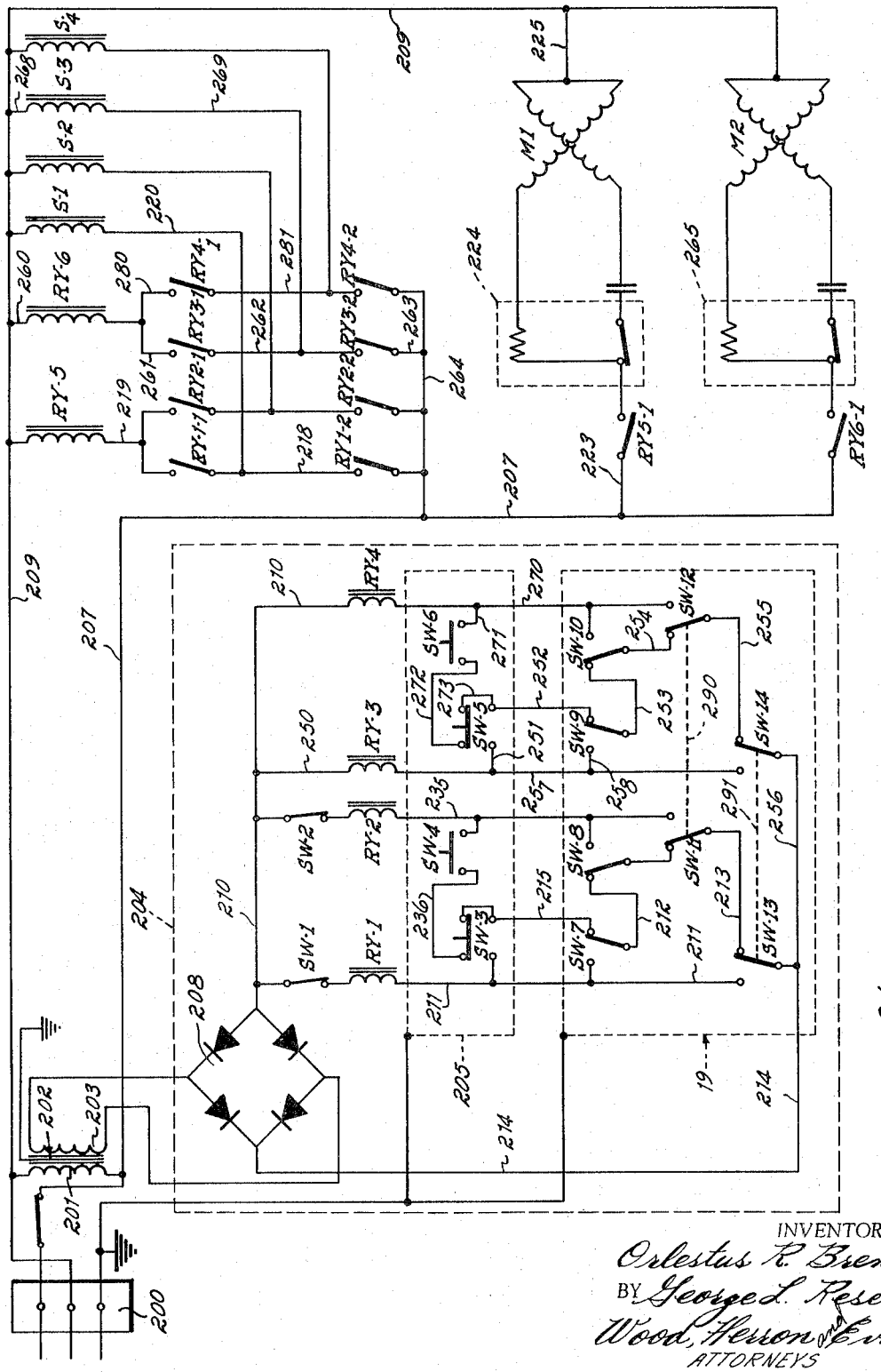

United States Patent Office 3,302,022
Patented Jan. 31, 1967

3,302,022
VERTICALLY AND HORIZONTALLY ADJUSTABLE ROTATABLE UROLOGICAL X-RAY TABLE
Orlestus R. Brenner and George L. Reser, Cincinnati, Ohio, assignors to Liebel-Flarsheim Company, Division of Ritter Company, Inc., Rochester, N.Y., a corporation of Delaware
Filed Mar. 24, 1964, Ser. No. 354,245
15 Claims. (Cl. 250—57)

This invention relates to a special purpose table and more particularly to a urological table which may be used for cystoscopy, transurethral surgery, and urological radiology.

A new X-ray technique which is being used in surgery as well as for examination purposes involves intensification or amplification of the X-ray image. It permits visualization of internal organs with X-ray beams of much lower intensity than are required in direct fluoroscopy or X-ray examination. The primary advantage of X-ray intensification is that the X-ray dose received by a patient during an examination or operation is substantially reduced. Unfortunately, the wide application of image intensification has been seriously hampered by the limitations imposed by conventional tables and equipment used in urological radiology and surgery. It has therefore been an objective of the invention to provide a urological table better adapted for use with image intensification equipment. To this end, the table of this invention is cantilever supported and completely open underneath so that the image intensifier may be attached directly to the bottom of the table.

Urological tables all accommodate vertical and rotational movement. Heretofore, all urological tables have located the table moving motor or at least the controls for the motor directly beneath the table. Thus it was impossible to locate or attach the intensifier directly to the table because upon rotational movement of the table, the motor or controls would interfere and preclude table movement. The table of this invention completely overcomes this problem by locating the table motor and controls to one side of the table in a column upon which the table is cantilever mounted. Thus the area beneath the table is completely open and the intensifier may be attached directly to the bottom of the table without sacrificing any of the required table movements.

Still another objective of this invention has been to provide a cantilever supported urological table suited for both surgical and X-ray purposes. For surgical purposes, the table is vertically adjustable as well as rotatable from a Trendelenburg to an upright position; i.e. from a position in which the patient's head is located in a horizontal plane beneath his or her buttock to an upright position in which the table is nearly vertical. For X-ray purposes, the table is also movable in both the longitudinal and transverse directions independently of the vertical and rotational movements. The longitudinal and transverse movements of the table enable the patient to be moved beneath the X-ray tube without pushing and pulling him on the table so as to locate various portions of the body in an X-ray position. One example of a situation when movement is required is in X-ray examination of both of the patient's kidneys. Due to limited size of the intensifier face, the patient must be moved relative to the X-ray tube and intensifier in order to center each individual kidney over the intensifier area.

Still another objective of this invention has been to provide a urological table suitable for use in a surgical room without hermetically sealing any of the component parts of the table and without increasing the danger of an explosion. As is well known, anesthetic gases are heavier than air so that they tend to spill off of the table and collect on the floor of the surgical room. Most of these gases are volatile and some are highly explosive. Heretofore, urological tables have either ignored the danger of explosions with the result that patients sometimes suffered severe burns because of electrically ignited explosions or the electrical motors and control equipment for the table were located in hermetically sealed containers. Of course, hermetic sealing of all of this equipment substantially increases its cost. The table of this invention eliminates the danger of an electrically actuated explosion while simultaneously eliminating the need for hermetic sealing. To this end all high voltage electronic equipment is located at least five feet above floor level. This is higher than the highest vertical position to which the table may be moved so that there is no danger of heavier-than-air anesthetic gases spilling over onto the high voltage electronic equipment. The table does utilize an electrical foot pedal control system but the electronic controls in the foot pedal utilize a current limited low voltage: less than eight volts and 0.3 ampere. A spark generated by this low voltage equipment would not be sufficiently hot to ignite any conventional anesthetic gas.

Still another objective of this invention has been to provide a urological table having independent vertical and rotational movements such that the table may be simultaneously moved vertically and rotated, the rate of rotation and the rate of vertical movement being so correlated that the buttocks supporting end of the table remains stationary as the table is moved from a Trendelenburg position (in which the patient's head is located beneath the horizontal plane of his buttocks) to a reverse Trendelenburg position (in which the plane of the table is located less than fifteen degrees from the horizontal plane in a rotational direction opposite that of the Trendelenburg). The net effect of this combined movement is that the table effectively pivots about its buttock supporting end. Otherwise expressed, this end of the table remains stationary during the combined movement from a minus fifteen to a plus fifteen degree position. Thus a doctor involved in transurethral surgery may move a patient from a Trendelenburg to a reversed Trendelenburg position without having to move so as to compensate for movement of the patient during these rotational changes of position. This is important to a doctor when viewing the bladder or urinary tract through a scope inserted into the urinary tract.

These and other objectives and advantages of the invention will be more readily apparent from a description of the drawings in which:

FIGURE 1 is a front perspective view of the table of this invention.

FIGURE 2 is a front elevational view of the table of FIGURE 1 with the X-ray intensifier, foot rest, knee crutches and X-ray tube removed illustrating in phantom the vertical positions to which the table is movable.

Figure 8:
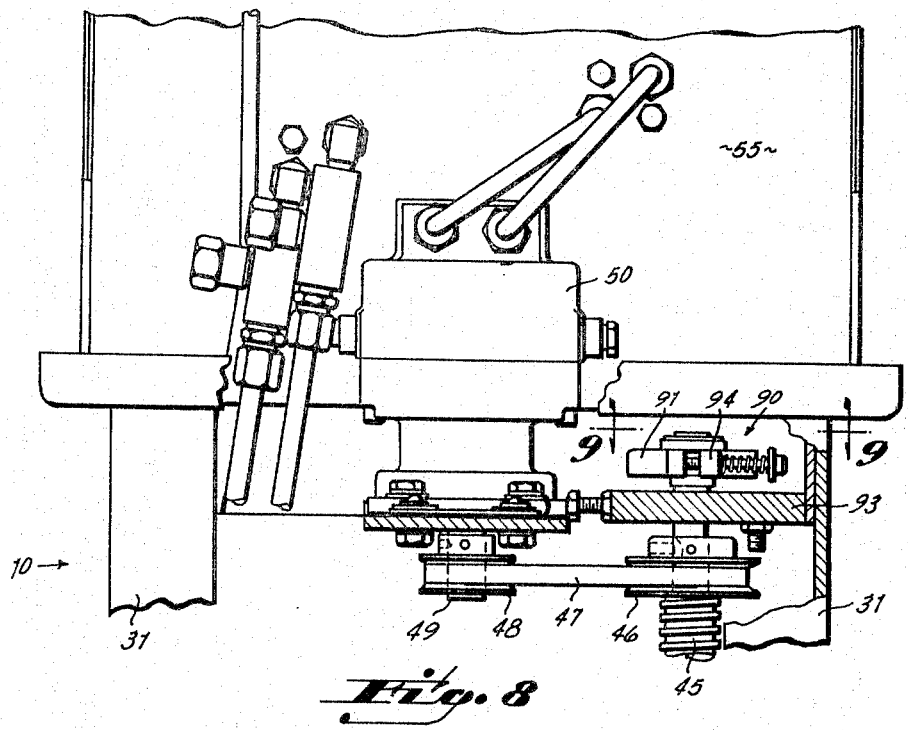
Figure 9:
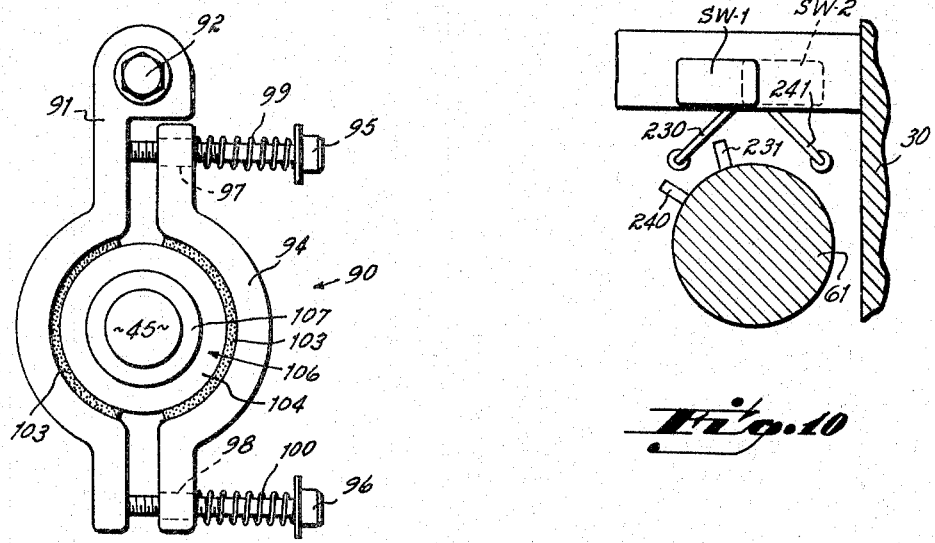
Figure 10:
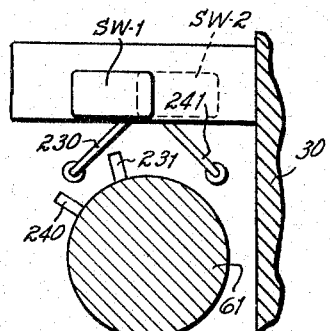
Figure 14:
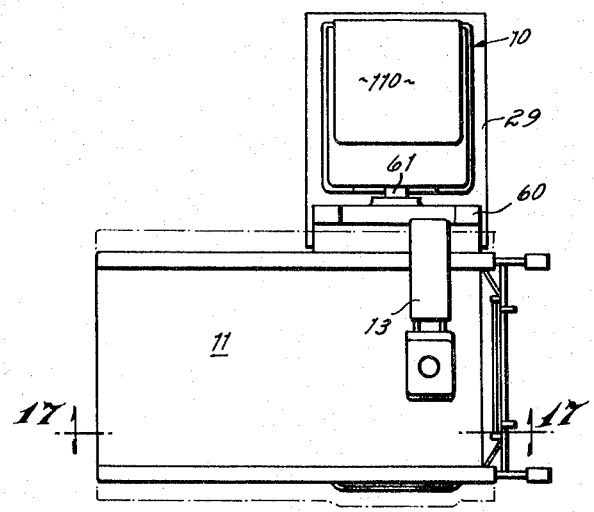
Figure 15:
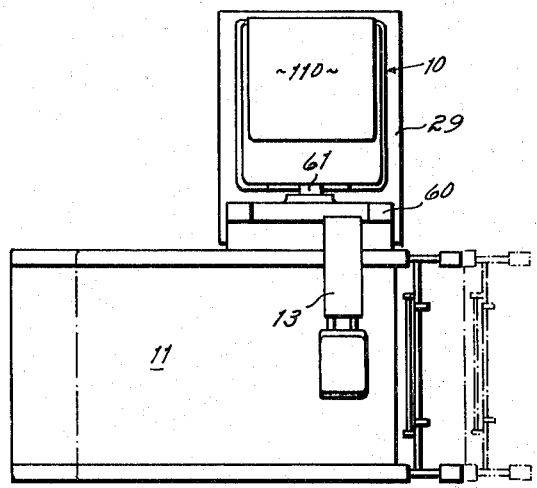

FIGURE 3 is a view similar to FIGURE 2 showing in phantom some of the rotational positions to which the table is movable, FIGURE 4 is a view similar to FIGURE 2 showing in phantom the combined vertical and rotational movement in which the buttock supporting end of the table remains stationary during combined movement, FIGURE 5 is a side elevational view of the table column with the column cover removed, FIGURE 6 is a vertical elevational view taken along line 6—6 of FIGURE 5, FIGURE 7 is an enlarged side elevational view, partially broken away, of the column carriage illustrated in FIGURE 5, FIGURE 8 is a cross sectional view taken along line 8—8 of FIGURE 5, FIGURE 9 is a cross sectional view taken along line 9—9 of FIGURE 8, FIGURE 10 is a diagrammatic cross sectional view taken along line 10—10 of FIGURE 7, FIGURE 11 is a front elevational view taken along line 11—11 of FIGURE 5, FIGURE 12 is a cross sectional view taken along line 12—12 of FIGURE 11, FIGURE 13 is a perspective view of one of the telescoping cover plates illustrated in FIGURE 11, FIGURE 14 is a top plan view of the machine illustrating in phantom lateral movement of the table, FIGURE 15 is a view similar to FIGURE 14 but illustrating in phantom the longitudinal movement of the table, FIGURE 16 is a front elevational view of the table, FIGURE 17 is a cross sectional view taken along line 17—17 of FIGURE 14, FIGURE 18 is a cross sectional view taken along line 18—18 of FIGURE 16, FIGURE 19 is a cross sectional view taken along line 19—19 of FIGURE 17, FIGURE 20 is a cross sectional view taken along line 20—20 of FIGURE 17, FIGURE 21 is a cross sectional view taken along line 21—21 of FIGURE 16, FIGURE 22 is a diagrammatic illustration of the electrical control system of the table.

Referring to FIGURE 1, it will be seen that the table of this invention consists of a column or tower 10 from which extends and upon which is supported a cantilever table indicated generally at 11. The table supports and has fixedly mounted thereon a vertically extending column 12 at the upper end of which is an X-ray tube support 13. A conventional X-ray tube 14 is mounted on the outer end of this support 13.

In FIGURE 1 the table is illustrated as having some accessory equipment mounted upon it. For purposes of clarity, this equipment is removed from the remaining figures of the drawings. It includes an X-ray intensifier 15 which is located beneath and attached to the bottom surface of the table 11. Other illustrated accessory equipment includes an adjustable and removable footrest 16 and a pair of knee crutches 17, one of which is broken away at 18.

The table may be moved and controlled from a foot control indicated generally at 19. It supports switches which control vertical movement, rotational movement, and combined vertical and rotational movement of the table. In the case of the combined movement, the rate of rotational change and vertical movement are so correlated that, as shown in FIGURE 4, the table effectively pivots about the buttock supporting end 22. In other words, this end of the table remains stationary during the combined movement of the table. This is more fully explained hereinafter in connection with the operation of the table.

*Table supporting tower*

The tower or column 10 supports a movable carriage 30 for vertical adjustment within the enclosure of the tower 10. The carriage in turn supports the table 11 for rotational movement. As a result of the double adjustment, the position of the table 11 may be altered both from the standpoint of height and angulation.

The tower 10 consists of four vertically extending right angle brackets 31 attached to a base plate assembly 32. The base assembly 32 is in turn bolted to a floor plate 29. Plate 29 may be smaller than the table in which event the tower 10 must be bolted to the floor. Alternatively, it may be larger than the table in which event there is no necessity for bolting it down.

Spaced above the base plate assembly 32 and supported upon the corner columns 31, is a lower supporting platform 33. An upper supporting platform 34 is supported upon the upper ends of the columns 31.

These two platforms 33, 34 together support a pair of carriage supporting slideways 36, 37 which are bolted at their ends to the platforms.

Referring to FIGURES 5, 6 and 7, it will be seen that the carriage 30 which is slidable upon the rods 36, 37 and supported thereon is a generally box-like assembly which houses the motor and transmission for controlling rotational movement of the table 11. It is slidable along the ways 36, 37 upon lower bushings 38, 39 mounted in the bottom 40 of the carriage 30 and a pair of upper bushings 42, 43 mounted in the top 44 of the carriage 30 coaxial with the bushings 38, 39 respectively. The rods 36, 37 extend through these bushings and thus permit slidable movement of the carriage.

Vertical adjustment of the carriage 30 upon the ways 36, 37 is brought about by a vertically extending drive screw 45. It is supported between the lower platform 33 and the upper platform 34 and extends through a nut (not shown) rigidly mounted in the upper portion of a carriage 30 so that upon rotation of the drive screw, the carriage is forced to move up or down depending upon the direction of rotation of the screw.

Referring to FIGURES 5 and 8, it will be seen that the screw 45 is driven in rotation by a pulley 46. The pulley 46 is in turn driven by a belt 47 which is driven from a pulley 48 mounted on the end of a drive shaft 49 of a hydraulic motor 50. Motor 50 is driven from a hydraulic pump (not shown) which is in turn driven by an electrical motor M2 mounted in a closed housing 55 on the top of the upper platform 34. The motor M2 is, as shown in FIGURE 22, a unidirectional motor which drives the hydraulic pump (not shown) which in turn supplies fluid to the hydraulic motor 50. An electrically actuated valve (not shown) controls the direction of rotation of the hydraulic motor 50 by changing the direction of fluid flow to and from the motor 50.

At this point it should be noted that the housing 55 is not hermetically sealed even though it contains high voltage electrical equipment including all of the high voltage control circuitry and the electrical motors M and M2 for adjusting the table height and angulation. While the table is used for surgical purposes in rooms where volatile or explosive anesthetic gases are in use, it need not be hermtically sealed since the housing 55 is located at least five feet above floor level and above any horizontal plane to which the table is movable. Anesthetic gases are heavier than air so that they spill over and off of the table without contacting the housing 55 or the unprotected electrical equipment contained therein.

Referring to FIGURES 7 and 18, it will be seen that the table 11 is supported upon a yoke 60 which has one end in the form of a shaft 61 extending through a bushing 62 of carriage 30. A worm gear 63 is attached to the rear end of this shaft 61. It is driven by a worm screw 64 attached to a shaft 65. Shaft 65 is in turn driven by a sprocket 66 and chain 67 which is driven from a sprocket 68 mounted upon an idler shaft 69. The idler shaft is in turn driven by a sprocket 70 from a sprocket 71 through a chain 72. The sprocket 71 is mounted upon the end of a drive shaft 75 of a hydraulic motor 76 mounted within the carriage 30. The motor 76 is a reversible hydraulic motor the direction of which is controlled by the direction of fluid flow in inlet and exhaust lines 78, 79. Fluid in these lines is supplied from a pump (not shown) which is in turn driven by an electrical motor M1. Here again an electrically actuated valve (not shown) located in the fluid circuit between the pump and the fluid motor 76 controls the direction of rotation of the hydraulic motor 76. The gears and chain drives between motor shaft 75 and the shaft 61 of the table supporting yoke cooperatively function as a gear reducer so that relatively rapid rotation of the motor shaft will result in relatively slow rotational movement of the table. Furthermore, a large mechanical advantage is achieved through this gear reducer.

The hydraulic motor 76 is preferred over an electrical motor because it eliminates any chance of an electrical spark igniting an explosion of anesthetic gases. Here again the high voltage electrical equipment is contained in the housing 55 away from and in a position in which the explosive gases cannot come in contact with an electrical spark.

Referring now to FIGURES 8 and 9, it will be seen that a brake indicated generally at 90 is mounted upon the upper end of carriage drive screw 45. This brake consists of a pivotally mounted brake shoe 91 supported for pivotal movement upon a shaft 92. The shaft 92 is in turn supported upon a platform 93 attached to one of the corner columns 31. A second brake shoe 94 is slidably supported upon a pair of bolts 95, 96 which pass through apertures 97, 98 of the second brake shoe 94 and are threaded into threaded apertures (not shown) of the first brake shoe 91. Compression springs 99, 100 coact between the heads of bolts 95, 96 and the sides of brake shoe 94 in such a manner as to bias the second brake shoe 94 toward the first brake shoe 91. Each of the brake shoes 91, 94 has an inner brake lining 103 mounted upon its inner face and engageable with the periphery of the outer face 104 of a conventional one-way bearing indicated generally at 106. The inner race 107 of the one-way bearing 106 is rigidly attached to the screw 45 and is freely rotatable relative to the outer race when the screw is rotated in a direction to move the table upwardly. However, when the screw is rotated in a direction to move the table downwardly, the outer race of the bearing locks into engagement with the inner race so that the outer race then must rotate with the inner race and the screw as the table is moved. Thus, when the table is moved downwardly, the complete one-way bearing 106 must rotate with the screw 45 relative to the stationary brake 90 which retards or slows the downward movement of the table. By adjusting or rotating the screws 95, 96 the frictional engagement or frictional force between the bearing and the brake may be regulated or adjusted. The necessity for this braking arrangement when the table is moved downwardly is brought about by the weight of the table which is sufficiently heavy with a patient located thereon to overcome the hydraulic motor and move downwardly of its own volition unless some means is provided to preclude this independent and uncontrolled movement. The brake thus provides the control so that the table only moves downwardly when the motor is driven in rotation.

Referring now to FIGURE 1, it will be seen that the tower 10 is completely enclosed within a housing or skin 119 which includes a cover 110 enclosing the electronic and hydraulic gear within the box 55. This cover protects the carriage 30 from dust and extraneous debris.

In order to completely enclose the carriage while still permitting vertical movement of the shaft 61 which extends from the carriage 30 through the housing, a telescoping guard is provided. As shown in FIGURES 1, 11, 12 and 13, the telescoping guard consists of two series of extensible interconnected plates slidable within vertically extending grooves of a pair of spaced guide rails 113, 114 located on the front of the column. The shaft 61 of the table yoke 60 extends through an aperture defined in two of the adjacent plates 112 so as to attach two of these plates to the shaft.

Referring to FIGURE 13, it will be seen that the upper and lower edges of each plate 112 extend horizontally in opposite directions so that in cross section each plate appears to be generally of Z-shaped configuration. When assembled, the plates 112 overlap so that the end flanges 115, 116 of adjacent plates are hooked over each other. In the case of those plates located above the shaft 61, the upper flanges extend rearwardly over the forwardly extending lower flanges of adjacent plates. This relationship is inverted for the plates located beneath the shaft 61 so that the upper flanges extend forwardly over the rearwardly extending flanges of the adjacent plates. The uppermost and lowermost plates, 117 and 118 respectively, are attached to the tower cover 119 while the two center plates are attached to the shaft 61. Thus when the shaft 61 moves vertically relative to the housing, the plates 112 slide in the guide rails to maintain a telescoping guard over the space between the rails 113 and 114.

*The table*

The table 11 is mounted upon the rotatable yoke 60 for both transverse and longitudinal movements as illustrated in phantom in FIGURES 14 and 15 respectively. The purpose of these movements is to facilitate movement of patients for X-ray or fluoroscopic work. Since the table is movable in both of these coordinates, the patient need not be pushed or pulled around the table surface in order to X-ray various parts of the anatomy.

Referring to FIGURES 1, 17 and 18, it will be seen that the table 11 is mounted for longitudinal movement upon a carriage 120. The carriage 120 is in turn mounted for transverse movement upon the pivotable yoke 60. As shown in phantom in FIGURE 14, the table 11 is capable of transverse movement either toward or away from the tower from its centered position. By centered position, it is meant that the urinary tract of a patient located on the table will be centered beneath the X-ray tube 14. To obtain an X-ray photograph of the patient's right kidney when supported upon the table, the table would be moved transversely toward the tower. A photograph of the left kidney of the patient would be taken with the table moved away from the tower 10.

As shown in phantom in FIGURE 15 this table is also movable longitudinally so as to locate various portions of the urinary tract of a patient immediately beneath the X-ray tube 14. This movement accommodates fluoroscopic or X-ray viewing of higher portions of the urinary tract when the table is moved to the right as shown in phantom in FIGURE 15.

Referring to FIGURES 16, 18 and 21, it will be seen that the yoke 60 is in reality a rotatable platform supported in cantilever fashion from the shaft 61. It was a large square central aperture 122 which accommodates fluoroscopic viewing via the intensifier or amplifier 15 (FIGURE 1). For this purpose, the area above and beneath the aperture 122 is X-ray clear when the X-ray film supporting cabinet or Bucky 123 is moved all the way to the left as viewed in FIGURE 17.

Referring to FIGURE 1, it will be seen that the intensifier 15 used in conjunction with this table is mounted directly beneath the table and is attached thereto so that it and the X-ray tube support 13 which is also movable with the table remain in alignment in all rotated positions of the table. In order to permit the intensifier to be mounted directly beneath the table, the table must be X-ray clear. Therefore, the X-ray cabinet or Bucky 123, which is used to support X-ray photographic film when the table is used for conventional X-ray procedures, is moved longitudinally within the table so as to be movable to a position out of the vertical alignment with the aperture 122. When the cabinet or Bucky 123 is moved all the way to the left as viewed in FIGURE 17, the only solid object between the X-ray tube 14 and the intensifier 15 is the table top 124. It is made from Formica or other conventional X-ray clear material which has minimum tendency to scatter or absorb radiation.

Referring to FIGURES 18 and 21, it will be seen that the yoke 60 supports four bearing blocks 125 at each of its four corners. The bearing blocks 125 extend from the yoke 60 and have mounted therein conventional bearings within which are slidable guide rods 127 mounted upon the underside of the carriage 120. A separate guide rod 127 is mounted for sliding movement in each of the guide blocks 125, the two guide rods on each side of the yoke being tied together at their ends by a U-shaped bracket 129 attached to the underside of the carriage 120.

The bracket 129 also has a central aperture 130 adapted to receive the end of a plunger 131 of a lock mechanism which holds the carriage in a centered position. The plunger 131 is slidably mounted within an aperture 133 of a block 132 attached to the yoke 60. A spring 134 biases it up into a locked position in which the plunger 131 extends into the aperture 130.

To unlock the carriage, a lock actuator in the form of a horizontally slidable bracket 135 is provided. It is slidably supported by screws 136, 137 which extend through longitudinally extending slots (not shown) in the bracket 135. A handle 138 attached to the bracket 135 may be manually grasped and pulled forwardly to move the bracket 135 and a cam surface 140 thereon between a head 141 of the plunger and the bottom surface of the block 132. Thus the cam surface 140 causes the plunger 131 to move down against its spring bias out of engagement with the carriage 120 and its connected bracket 129.

When the carriage 120 is unlocked, a handle 144 connected to its front edge may be manually grasped and pulled or pushed to move the carriage to either of the positions shown in phantom in FIGURE 14. To lock the carriage in a centered position the handle 138 is pushed rearwardly and then the handle 144 pushed or pulled until the detent plunger 131 slides into the aperture 130 of the bracket 129.

Referring to FIGURES 17, 18 and 19, it will be seen that a pair of upwardly extending ribs are located along the front and rear edges of the carriage 120. These ribs 145, 146 each support a pair of laterally extending rollers 148 and a pair of adjustable spacer blocks 149. All of the rollers and spacer blocks 148, 149 extend into a pair of laterally spaced U-shaped channels or tracks 152 attached to the bottom of the table 11. When the table is moved longitudinally relative to the carriage 120, the tracks 152 attached to the table move relative to the axially fixed but rotatable rollers. The adjustable spacer blocks 149 are provided simply for the purpose of taking up slack or play in the tracks.

The table 11 consists of a sheet metal body reinforced with angle irons and having a Formica top 124. The tracks 152 along which the table slides relative to the carriage 120 are welded or otherwise secured to the sheet metal frame.

For purposes of moving the table longitudinally relative to the carriage, a hand crank 155 extends from the front of the table as shown in FIGURES 1, 16, 20 and 21. This crank is non-rotatably connected to a shaft 156 which is rotatably mounted upon the carriage 120. This mounting includes a box-like frame section 157 which houses a bevel gear drive 158 to a feed screw 159 mounted within a housing 160 attached to the carriage 120. Thus upon rotation of the hand crank 155, the screw 159 is caused to rotate via the bevel gear drive 158.

Depending from the underside of the table 11 is a feed block or nut 165. Upon rotation of the feed screw 159, the nut 165 is caused to be moved linearly either to the right or left as viewed in FIGURE 17 depending upon the direction of rotation of the crank and thus the feed screw. Movement of the nut 165 imparts linear movement to the table 11 upon which it is mounted.

Referring to FIGURE 19, it will be seen that an X-ray cabinet 123 or a Bucky as it is more commonly known is mounted upon rollers 168 for longitudinal movement along tracks 169 on the interior of the table. As explained earlier, longitudinal movement of the Bucky is necessary to permit the table to be used for X-ray intensification. When the table is used with the intensifier 15 there can be no metal or X-ray scattering material between the X-ray tube 14 and the intensifier 15. Thus the Bucky 123 must be movable from its normal position of use over the aperture 122 in the yoke 60 to the position illustrated in FIGURE 1 in which it is completely out of alignment with X-rays emitted from the tube.

Since X-ray cabinet or so-called Bucky diaphragms are conventional on X-ray tables, the Bucky 123 will not be described in detail. A complete description of a Bucky may be found in Billin Patent No. 2,992,046, assigned to the assignee of this application.

Buckys conventionally weigh up to 60 pounds. Therefore, it has been conventional to move the Buckys by means of a screw and nut arrangement similar to that utilized to control longitudinal movement of this table. However, screw and nut adjustments of the Bucky involve a waste of time for the doctor or technician to move the Bucky out of the way. Therefore, as shown in FIGURES 17, 19 and 20, the Bucky 123 of this table is counterbalanced by weights 175. The total weight of the counterbalances 175 is approximately equal to the weight of the Bucky. Thus, movement of the Bucky requires only the overcoming of friction between the counterbalance rollers and the Bucky rollers and the tracks upon which they are movable. This total force requirement is rather nominal so that the Bucky may be pushed or pulled from one position to another manually and will remain in that position irrespective of the angular position of the table.

Referring to FIGURES 17 and 19, it will be seen that the counterweight supporting rails 176 are attached at their ends to the table frame. An intermediate support 177 is also provided near the longitudinal center of each rail to prevent its sagging under the weight of the counterbalances 175.

Referring now to FIGURES 19 and 20, it will be seen that the interconnection between the Bucky 123 and the counterweights 175 consists of a pair of flexible wires 188, 189 rigidly connected to opposite sides of the Bucky and to the counterweights 175 and extending over pulleys 193 and 194 located at the ends of the table. As shown in FIGURE 20, one end 190 of each wire 188, 189 is connected to a platform 191 upon which the Bucky is supported. The carrier wire extends from this end 190 transversely through an aperture 192 in the platform 191, longitudinally of the table, to and around an end pulley 193 at the right end of the table as viewed in FIGURES 17, 19 and 20. From the pulley, each wire extends longitudinally of the table through an aperture of the counterweight 175. The wire is fixed to the counterweight as by a pair of knots 194 (FIGURE 19) tied at opposite ends of the counterweight. From the counterweight, each wire extends longitudinally of the table to and around a second pulley 195 at the left end of the table. From the pulley 195, each wire extends longitudinally of the table and back up through the aperture 192. After passing through the aperture 192, the end 196 of the wire is attached to the platform 191.

The wires 188, 189 may thus be viewed as endless cables extending between pulleys 193 and 195 and having upper stretches to which the Bucky is fixed and lower stretches to which the counterweights are attached. Linear movement of the Bucky platform 191 and the Bucky 123 mounted thereon in either direction longitudinally of the table causes an equal and opposite direction movement of the counterweights 175. As a consequence, the Bucky may be moved by simply pushing or pulling it either into or out of alignment with the X-ray tube 14. And this movement may occur irrespective of the angular position of the table since even if the table is in a vertical position, as the Bucky moves down the counterweights move up an equal distance.

Longitudinal and transverse movement of the table 11 is controlled manually either by pulling upon the handle 144 to move the table transversely or rotating the crank 155 to move the table longitudinally. However, vertical movement of the table, as illustrated in phantom in FIGURE 2, is controlled either by the foot pedal control 19 or a hand control (not shown). Similarly, the rotational movement, illustrated in phantom in FIGURE 3, may be controlled from either of these controls. Likewise, the combined rotational and vertical movement, which results in no displacement of the buttock supporting end of the table, may be controlled from the foot control 19 or the hand control. However, the combined movement is accomplished with greater facility at the foot control 19 than the hand control since special combination movement buttons are provided at the foot control 19. The hand control has no such combination movement switches or buttons although the same result may be accomplished by simultaneous actuation of two switches or buttons at the hand control. Since the combination movement buttons or switches are provided primarily for the benefit of a doctor whose hands are occupied while he is involved in transurethral surgery, the combination buttons have been omitted from the hand control.

Angular and height adjustments of the table will be better understood when described with reference to the electrical control circuit illustrated diagrammatically in FIGURE 22.

*Electrical control*

Referring to FIGURE 22, it will be seen that 115 volt 60 cycle electrical power is supplied to the machine control panel 200. This panel is mounted within the housing 110 at the top of the tower 10 above the level to which the table is movable; in the preferred embodiment at least five feet above the table. In order that no high voltage electrical equipment is located less than five feet above the floor level, the electrical cables to the machine are brought in overhead along the ceiling. From the control panel 200, electrical current is fed to the primary winding 201 of a transformer 202 from whence low voltage control power is fed to the low voltage control circuit enclosed within the phantom lines 204. While all of the low voltage control circuit may be located outside the housing 110 without creating any danger of an electrical explosion, in the preferred embodiment only that located within the hand control 205 and the foot control 19 is located outside this housing. The low voltage A.C. power is fed from the secondary winding 203 of transformer 202 to a rectifier bridge 208. D.C. power is tapped from the rectifier bridge and fed into parallel control circuits in both the hand control 205 and the foot control 19.

The hand control contains four switches for controlling vertical adjustment and rotational movement of the table. The foot control 19 contains eight switches, four of which are combined in such a way as to provide the same action or controls as two double-pole double-throw switches. The double-pole switches are used to control the "combined" table movement. As explained earlier, during combined movement of the table 11, the trunk or buttock supportnig end 22 (the right end as viewed in FIGURE 1) remains stationary while the opposite or head supporting end ostensibly pivots about the other end 22. This movement is illustrated in phantom in FIGURE 4.

Connected in parallel with the primary windings of the transformer 202 is a high voltage control circuit including the electrical motors M1 and M2 to which electrical power is fed via leads 207 and 209. As mentioned earlier, the motor M1 is used to drive a fluid pump which controls clockwise and counterclockwise movement of the table while the electrical motor M2 is used for driving the hydraulic pump which controls height adjustment or vertical movement of the table.

The operation of the machine and the explanation of the wiring diagram is better understood when explained in relation to a cycle of operation. By way of example, assume that it is desired to rotate the table in counterclockwise direction as viewed in FIGURE 1. For this purpose either the hand control switch SW3 or the foot control switch SW7 may be actuated. Assuming that the foot control switch SW7 is actuated, it will complete a circuit from the rectifier bridge 208 via lead 210, through normally closed switch SW1 and the coil of relay RY1, via lead 211, through closed switch SW7, via lead 212, through the normally closed contacts of switches SW8 and SW11, via lead 213 and normally closed switch SW13 to the other lead 214 from the rectifier bridge 208. The same circuit may be closed through switch SW3 in which case the circuit between leads 211 and 212 would be completed through the switch SW3, lead 215, and the normally closed contacts of switch SW7. Energization of this low voltage control circuit energizes the relay RY1 causing the normally open contacts RY1–1 and RY1–2 to close. The closing of these contacts completes a high voltage circuit to the relay RY5 via lead 207, contact RY1–2, lead 218, contact RY1–1, lead 219, relay RY5 and lead 209. Simultaneously, a circuit is completed to a solenoid S1 via lead 209, relay S1, and leads 220, 218 and 207.

Energization of relay RY5 closes a normally open contact RY5–1 to complete a high voltage circuit to the motor M1 via lead 207, lead 223, contact RY5–1, thermal switch 224, and leads 225 and 209. The simultaneous energization of solenoid S1 actuates a hydraulic valve causing it to move into a position in which fluid flow from the hydraulic pump (not shown) driven by the motor M1 is directed to that side of the hydraulic motor 76 which results in counterclockwise rotation of the table as viewed in FIGURE 1. It will be noted that the circuit to the relay RY1 was completed through the normally closed switch SW1. This is a limit switch shown diagrammatically in FIGURE 10. As there illustrated, the actuator 230 of switch SW1 is in a position to by engaged by an abutment 231 attached to the shaft which supports the table 11 for rotational movement. After the table has rotated approximately 15° in the counterclockwise direction from a horizontal position as viewed in FIGURE 1, the abutment 231 engages the actuator 230 of switch SW1 to open this switch. When this switch is open, it opens the circuit to the electric motor M1, and the solenoid S1. Thus rotational movement of the table in the counterclockwise direction past a 15° position is precluded so that a patient cannot be inadvertently dumped off of the table onto his head.

In order to rotate the table in the clockwise direction, either the normally open hand control switch SW4 or the foot control switch SW8 is actuated. Considering first the hand control switch, it will be seen that closing of the switch SW4 completes a circuit to the relay RY2 via lead 210, through the normally closed limit switch SW2, through relay RY2, through lead 235 and switch SW4, via lead 236, through the normally closed contacts of switch SW3, via lead 215, through the normally closed contacts of switch SW7, switch SW8, and switch SW11, via lead 213, via the normally closed contacts of switch SW13, and via lead 214. Relay RY2 may alternatively be energized by actuating the foot control switch SW8 in which case a circuit will be completed via lead 235, through the normally open contacts of switch SW8 and via the normally closed contacts of switches SW11, and SW13, through lead 214. Energization of the relay RY2 closes the normally closed contacts RY2–1 and RY2–2 thereby completing a high voltage circuit to the relay RY5 and the solenoid S2. As explained earlier, energization of the relay RY5 causes the normally open contact RY5–1 to close and complete a circuit to the electrical motor M1. Energization of the solenoid S2 moves the valve which controls the direction of rotation of hydraulic motor 76 in a direction in which the fluid flow to the motor 76 results in clockwise rotation of the table as viewed in FIGURE 1. When the switches SW4 and SW8 are released, they are returned to their original position to de-energize the relay RY2 and thus the relay RY5 and solenoid S2.

The switch SW2 which is in series with the relay RY2 is a limit switch very similar to the limit switch SW1. Referring to FIGURE 10, it will be seen that after the table has been rotated approximately 88° from the horizontal position illustrated in FIGURE 1, i.e., to a position in which the table top is very nearly in a vertical plane, the abutment 240 engages the actuator 241 of switch SW2 causing that switch to open and open the circuit to the relay RY2. The switch SW2 thus serves as a limit switch to preclude the table being moved past a vertical position.

Vertical movement of the table is controlled by either the hand control switches SW5 and SW6 or the foot control switches SW9 and SW10; the switches SW5 and SW9 being operable to control lowering of the table and the switches SW6 and SW10 being the ones which control raising of the table. Taking first the hand control switch, it will be seen that manual actuation of the switch SW5 completes a circuit to the relay RY3 via leads 210, 250 and 251, through the normally open contacts of switch SW5, via lead 252, through the normally closed contacts of switch SW9, via lead 253, through the normally closed contacts of switch SW10, via lead 254, through the normally closed contacts of switch SW12, via lead 255, through the normally closed contacts of switch SW14 and via leads 256 and 214. The relay RY3 could also be energized upon actuation of the foot control switch SW9 which completes a circuit to this relay via leads 210, 250, 257, and 258, through the normally open contacts of switch SW9, and via leads 253, 254, 255, 256 and 214. Energization of the relay RY3 causes the contacts RY3-1 and RY3-2 in the high voltage circuit to be closed. Closing of these contacts completes a circuit to the relay RY5 via leads 209, 260, 261, through the contacts RY3-1, lead 262, via contacts RY3-2, and leads 263, 264 and 207. Energization of the relay RY6 causes the contact RY6-1 to close so as to complete a high voltage circuit to the motor M2 via lead 209, through a thermal switch 265, via the contact RY6-1 and lead 207. Actuation of the electric motor M2 causes it to rotate so as to drive the hydraulic pump (not shown) which supplies fluid to the hydraulic motor 50 (FIGURE 8). The direction in which the table moves, up or down, is determined by the solenoids S3 and S4 which control the directional valve (not shown) for supplying fluid to the hydraulic motor 50. In the case of the circuit which is completed upon actuation of the foot control switch SW9 or the hand control switch SW5, the solenoid S3 is actuated which results in lowering of the table. This circuit is completed via leads 209, 268, through the solenoid S3, via leads 269, 262, through the contact RY3-2 and via leads 263, 264 and 207.

To raise the table, either the hand control switch SW6 or the foot control switch SW10 may be manually actuated. Closing of the normally open switch SW6 completes a circuit to the relay RY4 via lead 10, through relay RY4, lead 270, lead 271, through the normally open contacts of switch SW6, via lead 272, through the normally closed contacts of switch SW5, via leads 273, 252, through normally closed contacts of switch SW9, via lead 253, through the normally closed contacts of switch SW10, via lead 254, through the normally closed contacts of switch SW12, via lead 255, through the normally closed contacts of switch SW14 and via leads 256 and 214.

If the relay RY4 was to be energized by the foot control switch SW10 rather than the hand control switch SW6, the circuit to the relay RY4 would be completed via lead 210, through the relay RY4, via lead 270, through the normally open contact of switch SW10, via lead 254, through the normally closed contact of switch SW12, via lead 255, through the normally closed contact of switch SW14 and via leads 256 and 214. Upon energization of the relay RY4 the contacts RY4-1 and RY4-2 of the high voltage control circuit are closed thereby completing a circuit to the relay RY6. This latter circuit is completed via lead 209, through the relay RY6, via lead 280, through the contacts RY4-1, via lead 281, through contact RY4-2 and via leads 264 and 207.

As explained above, energization of the relay RY6 closes the contact RY6-1 to complete a circuit to the electric motor M2. Simultaneously with the energization of the relay RY6 a circuit to the directional solenoid S4 is completed. Energization of this solenoid causes the valve (not shown) in the hydraulic circuit between the pump (not shown) driven by the electric motor M2 and the hydraulic motor 50 to be moved into a position in which fluid is supplied to the motor 50 in a direction operable to raise the table.

The foot control 19 also contains a pair of combination movement switches 290 and 291. One of these switches, 290, is used to control simultaneous head-up or clockwise rotation of the table as viewed in FIGURE 1, and raising of the table. In this way the table may be moved from the position indicated at 292 in FIGURE 4 to that indicated at 293 without changing the elevation of the buttock supporting end 22 of the table 11. This movement is important to surgeons during certain operational procedures when they wish to change the angle of the patient without changing the elevation of the viewing scope or instruments which are at that time inserted into the patient. The doctors either work from a sitting down or a standing up position. When they change the angle of the patient so as to operate upon or view another section of the urinary tract, they desire to have the scope or their working level remain stationary. This can only be done by simultaneously rotating the table in the clockwise direction as viewed in FIGURE 4 and raising it. Alternatively if the table is to be rotated in the counterclockwise direction from the position indicated in phantom at 293 to that indicated in phantom at 292 the table must be lowered simultaneously with rotation in order that the working end of he table 22 remains stationary.

Foot pedal closing of the foot control switch 290 closes both the contacts of switches SW11 and SW12 thereby completing circuits to the relays RY2 and RY4. The circuit to the relay RY2 is completed via lead 210, through the normally closed switch SW2, via leads 235, 213 and 214. The circuit to the relay RY4 is completed via lead 210, lead 270, the normally open contact of switch SW12, and via leads 255, 256 and 214.

As explained above, energization of the relay RY2 causes the contacts RY2-1 and RY2-2 to close thereby completing a circuit to the relay RY5 and the solenoid S2. Energization of the relay RY5 completes a circuit to the motor M1 via the normally open contact RY5-1 while simultaneously solenoid S2 locates the directional valve (not shown) in a position to cause clockwise rotation of the table as viewed in FIGURE 4. The relay RY4 which is energized simultaneously with the relay RY2 upon actuation of the manual switch 290 completes a circuit to the relay RY6 via the normally open contacts RY4-1 and RY4-2. Closing of the contact RY4-2 also completes the circuit to the solenoid S4 as explained above so as to cause the table to be raised. Thus a combination clockwise and raising movement of the table results from manual actuation of the foot control switch 290.

In much the same way, counterclockwise rotational movement of the table and lowering of the table results from pedal actuation of the foot control switch 291. Actuation of this switch completes a circuit to the relays RY1 and RY3. The circuit to the relay RY1 is completed via lead 210, through the normally closed switch SW1, via lead 211, through the normally open contact of switch SW13 and via lead 214. In the case of the relay RY3, the circuit to it is completed via leads 210, 250, 257, through the normally open contact of switch SW14 and via leads 256 and 214. As explained above, energization of the relay RY1 causes the contacts RY1–1 and RY1–2 to close and completes a circuit to the relay RY5 and to the solenoid S1. This results in closing of the normally open contact RY5–1 so as to complete a high voltage circuit to the electric motor M1 while locating the solenoid S1 in a position to direct fluid into the hydraulic motor 76 in a direction to cause counterclockwise rotation of the table as viewed in FIGURE 4.

Completion of the circuit to the relay RY3 causes the contacts RY3–1 and RY3–2 to close so as to complete a circuit to the relay RY6 and the solenoid S3. This results in closing of the contact RY6–1 to complete a circuit to the motor M2 while simultaneously energizing the solenoid S3 so that hydraulic fluid is pumped into the fluid motor 50 in a direction which results in lowering of the table. Thus manual actuation of the foot control switch 291 results in simultaneous counterclockwise rotation of the table as viewed in FIGURE 4 and lowering of the table. In this way the working end 22 of the urological table illustrated is caused to remain stationary while its opposite end is lowered.

From the above disclosure of the operation of the present invention and the preceding detailed description of a preferred embodiment, those skilled in the art will readily comprehend various modifications to which the invention is susceptible. Therefore, we desire to be limited only by the scope of the appended claims.

Having described our invention, we claim:

1. A cantilever type urological table comprising,
a floor supported column having a vertically extending longitudinal axis,
a vertically movable and rotatable table support mounted upon and extending laterally from said column,
means for moving said table support vertically relative to said column,
means for rotating said table support relative to said column about an axis transverse to the longitudinal axis of said column,
an X-ray table mounted upon said table support and including and X-ray transparent top surface member, and
means for mounting said table for lateral and longitudinal movement on said table support.

2. A cantilever type urological table comprising:
a floor supported column having a vertically extending longitudinal axis,
a vertically movable and rotatable table support mounted upon and extending laterally from said column,
means including a motor for moving said table support vertically relative to said column,
means including a motor for rotating said table support relative to said column about an axis transverse to the longitudinal axis of said column,
an X-ray table mounted upon said table support and including an X-ray transparent top surface member, and
means mounting said table upon said table support so that said table is free for movement laterally and longitudinally relative to said table support.

3. A cantilever type urological table comprising,
a floor supported column having a vertically extending longitudinal axis,
a vertically movable and rotatable table support mounted upon and extending laterally from said column,
means for moving said table support vertically relative to said column,
means for rotating said table support relative to said column about an axis transverse to the longitudinal axis of said column,
an X-ray table mounted upon said table support and including an X-ray transparent top surface member,
an X-ray film supporting cabinet slidably mounted in said table beneath said top surface member,
at least one counterbalance weight slidably mounted in said table and operatively connected to said X-ray cabinet whereby said weight is movable in one direction upon movement of said cabinet in the opposite direction, and
means mounting said table upon said table support so as to permit lateral and longitudinal movement of said table relative to said table support.

4. A cantilever type urological table comprising,
a floor supported column having a vertically extending longitudinal axis,
a vertically movable and rotatable table support mounted upon and extending laterally from said column,
means for moving said table support vertically relative to said column,
means for rotating said table support relative to said column about an axis transverse to the longitudinal axis of said column,
an X-ray table mounted upon said table support and including an X-ray transparent top surface member,
an X-ray film supporting cabinet slidably mounted in said table beneath said top surface member,
at least one counterbalance weight slidably mounted in said table and operatively connected to said X-ray cabinet whereby said weight is movable in one direction upon movement of said grid in the opposite direction,
means mounting said table upon said table support so as to permit lateral and longitudinal movement of said table relative to said table support, and
an X-ray intensifier mounted beneath and attached to said table.

5. A cantilever supported X-ray table comprising,
a floor mounted column having a vertically extending longitudinal axis,
a table extending laterally from one side of said column,
means for moving said table vertically on said column,
means for rotating said table relative to said column about an axis transverse to the longitudinal axis of said column,
means for supporting an X-ray tube in fixed relation relative to said table so that rotational and vertical movement of said table relative to said column results in identical movement of said X-ray tube supporting means, and
a radiological intensifier mounted beneath and attached to said table so as to be movable with said table and said X-ray tube supporting means.

6. An X-ray table comprising,
a floor supported base having a vertically extending longitudinal axis,
a movable table supported upon said base,
motor driven means for moving said table vertically relative to said base,
motor driven means for rotating said table relative to said base about an axis transverse to the longitudinal axis of said base,
means for supporting an X-ray tube in fixed relation relative to said table so that rotational and vertical movement of said table relative to said base results in identical movement of said X-ray tube supporting means, and
a radiological intensifier mounted beneath and attached to said table so as to be movable with said table and said X-ray tube supporting means.

7. An X-ray table comprising,
a floor supported base having a vertically extending longitudinal axis,
a movable table having an X-ray transparent top surface member supported upon said base,
an X-ray film supporting cabinet slidably mounted in said table beneath said top surface member,
at least one counterbalance weight slidably mounted in said table and operatively connected to said X-ray cabinet whereby said weight is movable in one direction upon movement of said cabinet in the opposite direction, motor driven means for moving said table vertically relative to said base, motor driven means for rotating said table relative to said base about and axis transverse to the longitudinal axis of said base, means for supporting an X-ray tube in fixed relation relative to said table so that rotational and vertical movement of said table relative to said column results in identical movement of said X-ray tube supporting means, and a radiological intensifier mounted beneath and attached to said table so as to be movable with said table and said X-ray tube supporting means.

8. A urological table comprising, a floor mounted vertically extending column having a vertically extending longitudinal axis, a table supported by said column and extending laterally from one side thereof, means including an electric motor for moving said table vertically upon said column, means including an electric motor for rotatably moving said table relative to said column about an axis transverse to the longitudinal axis of said column, said motor means being mounted upon said column at a location higher than the highest horizontal plane into which the top surface of said table is movable whereby explosive gases spilling from said table will not contact said electric motor means.

9. A urological table comprising, a floor mounted vertically extending column having a vertically extending longitudinal axis, a table supported by said column and extending laterally from one side thereof, means including an electric motor and a hydraulic motor for moving said table vertically upon said column, said electric motor being operable to drive a pump for supplying fluid to said hydraulic motor, and mean including an electric motor and a hydraulic motor for rotatably moving said table relative to said column about an axis transverse to the longitudinal axis of said column, said electric motor being operable to drive a pump for supplying fluid to said hydraulic motor, said electric motors being mounted upon said column at a location higher than the highest horizontal plane into which the top surface of said table is movable whereby explosive anesthetic gases spilling from said table will not contact said electric motor means.

10. A cantilever supported urological table comprising, a floor mounted vertically extending column having a vertically extending longitudinal axis, a carriage mounted for vertical movement within said column, means including a rotatable screw for moving said carriage vertically within said column, a rotatable table support extending laterally from one side of said carriage, an X-ray table mounted upon said support exteriorly of said column, means including an electric motor and a first hydraulic motor for rotating said screw so as to move said table vertically relative to said column, said electric motor being operable to drive a pump for supplying fluid to said hydraulic motor, a second hydraulic motor mounted on said carriage within said column for rotating said table support about an axis transverse to the longitudinal axis of said column, and means including an electric motor for supplying fluid to said second hydraulic motor, said electric motors being mounted upon said column at a location higher than the highest horizontal plane into which the top surface of said table is movable whereby explosive anesthetic gases spilling from said table will not contact said electric motor means.

11. A cantilever supported urological table comprising, a floor mounted vertically extending column having a vertically extending longitudinal axis, a carriage mounted for vertical movement within said column, means including a rotatable screw for moving said carriage vertically within said column, a rotatable carriage table support extending laterally from one side of said carriage, an X-ray table mounted upon said support exteriorly of said column, means including an electric motor for rotating said screw so as to move said table vertically relative to said column, a hydraulic motor mounted on said carriage within said column for rotating said table support about an axis transverse to the longitudinal axis of said column, and means including an electric motor for supplying fluid to said second hydraulic motor, said electric motor means being mounted upon said column at a location higher than the highest horizontal plane into which the top surface of said table is movable whereby explosive anesthetic gases spilling from said table will not contact said electric motor means.

12. A cantilever supported urological table comprising, a floor mounted vertically extending column having a vertically extending longitudinal axis, a carriage mounted for vertical movement within said column, means including a rotatable screw for moving said carriage vertically within said column, a rotatable table support extending laterally from one side of said carriage, an X-ray table mounted upon said support exteriorly of said column, means including a first electric motor for rotating said screw so as to move said table vertically relative to said column, means including a second electric motor for rotating said table support about an axis transverse to the longitudinal axis of said column, said electric motors being mounted upon said column at a location higher than the highest horizontal plane into which the top surface of said table is movable whereby explosive anesthetic gases spilling from said table will not contact said electric motor means.

13. A urological table comprising, a floor supported vertically extending column having a vertically extending longitudinal axis, a table supported upon and extending laterally from one side of said column, means including a foot operated control member for moving said table vertically upon said column, means including a foot operated control member for rotating said table relative to said column about an axis transverse to the longitudinal axis of said column, said table being rotatable from a position in which one end of said table is located fifteen degrees below a horizontal plane to a position in which said end is located fifteen degrees above the horizontal plane, and means including a foot operated control member for rotating said table from said first position to said second position while simultaneously moving said table downwardly at a rate of speed so related to the rate of rotation of said table that said one end of said table remains substantially stationary during said movement.

14. A urological table comprising, a floor supported base having a vertically extending longitudinal axis, a table movably supported upon said base, means including a motor and a foot operated control member for moving said table vertically relative to said base so as to change the height of said table, means including a motor and foot operated control member for rotating said table upon said base about an axis transverse to the longitudinal axis of said base to change the angle of inclination of said table relative to said floor, and means including a foot operated control member for changing the angle of inclination of said table while maintaining the height of one end of said table at a fixed elevation relative to said floor.

15. A cantilever supported urological table comprising, a floor supported vertically extending column having a vertically extending longitudinal axis, a table supported upon and extending laterally from one side of said column, means including a motor and a foot operated control member for moving said table vertically upon said column so as change the elevation of said table, means including a motor and foot operated control member for rotating said table relative to said column about an axis transverse to the longitudinal axis of said column to change the angle of inclination of said table, and means for changing the angle of inclination of said table while maintaining the height of one end of said table at a fixed elevation.

References Cited by the Examiner

UNITED STATES PATENTS

| | | | |
|---|---|---|---|
| 2,508,449 | 5/1950 | Davis et al. | 250—57 |
| 2,707,137 | 4/1955 | Hollstein | 269—323 |
| 2,840,429 | 6/1958 | McDonald | 269—323 |
| 2,901,302 | 8/1959 | Kizaur | 250—55 |
| 3,158,742 | 11/1964 | Morell et al. | 250—54 |
| 3,210,547 | 10/1965 | Eliot | 250—90 |
| 3,240,935 | 3/1966 | Dougall | 250—55 |

RALPH G. NILSON, *Primary Examiner.*

ARCHIE R. BORCHELT, *Examiner.*

A. L. BIRCH, *Assistant Examiner.*